United States Patent
Dix (10) Patent No.: US 8,060,269 B2
(45) Date of Patent: Nov. 15, 2011

(54) SWATH LINE CREATION INCLUDING SLOPE COMPENSATION FOR AN AUTOMATIC GUIDANCE SYSTEM OF A WORK VEHICLE

(75) Inventor: Peter J. Dix, Naperville, IL (US)

(73) Assignee: CNH America LLC, New Holland, PA (US)

( * ) Notice: Subject to any disclaimer, the term of this patent is extended or adjusted under 35 U.S.C. 154(b) by 499 days.

(21) Appl. No.: 12/148,003

(22) Filed: Apr. 16, 2008

(65) Prior Publication Data

US 2009/0265098 A1    Oct. 22, 2009

(51) Int. Cl.
*G01C 9/00* (2006.01)
*G06F 19/00* (2006.01)
*A01D 41/127* (2006.01)
*A01D 34/86* (2006.01)

(52) U.S. Cl. .......... 701/23; 701/25; 701/50; 56/102.2 R; 56/209

(58) Field of Classification Search .......... 701/1, 23, 701/25, 26, 50, 70, 74, 75, 200–201, 205–208, 701/211, 213, 300; 56/10.1, 10.2 R, 10.2 D, 56/10.2 F, 208, 209; 340/901, 988, 990, 340/995.1, 995.14, 995.19, 995.25, 438, 340/439, 440; 172/2, 4.5, 278–281
See application file for complete search history.

(56) References Cited

U.S. PATENT DOCUMENTS

| | | | |
|---|---|---|---|
| 4,809,490 A * | 3/1989 | Swanson | 56/370 |
| 5,348,226 A * | 9/1994 | Heiniger et al. | 239/1 |
| 5,987,383 A | 11/1999 | Keller et al. | 701/213 |
| 5,995,902 A | 11/1999 | Monson | 701/202 |
| 6,070,673 A | 6/2000 | Wendte | 172/2 |
| 6,104,339 A | 8/2000 | Nichols | 342/357.06 |
| 6,128,574 A * | 10/2000 | Diekhans | 701/209 |
| 6,199,000 B1 | 3/2001 | Keller et al. | 701/50 |
| 6,389,785 B1 | 5/2002 | Diekhans et al. | 56/10.2 |
| 6,463,374 B1 | 10/2002 | Keller et al. | 701/50 |
| 6,501,422 B1 | 12/2002 | Nichols | 342/357.17 |
| 6,553,299 B1 | 4/2003 | Keller et al. | 701/50 |
| 6,703,973 B1 | 3/2004 | Nichols | 342/357.17 |
| 2004/0124605 A1 | 7/2004 | McClure et al. | 280/456.1 |
| 2004/0186644 A1 | 9/2004 | McClure et al. | 701/50 |

\* cited by examiner

*Primary Examiner* — Tuan C. To
*Assistant Examiner* — Edward Pipala
(74) *Attorney, Agent, or Firm* — Sue C. Watson; Patrick Sheldrake (57) ABSTRACT

An apparatus and method for generating swath lines including compensation for sloping terrain in a field for use in an automatic guidance system of a work machine. The swath lines are created as a function of the position, elevation and/or orientation of the work vehicle.

16 Claims, 10 Drawing Sheets

SWATH LINE CREATION INCLUDING SLOPE COMPENSATION FOR AN AUTOMATIC GUIDANCE SYSTEM OF A WORK VEHICLE

TECHNICAL FIELD

The present invention relates generally to apparatus and methods for GPS based vehicle guidance systems and more particularly to a method and apparatus for generating swath lines that compensate for error introduced when a swath line is located on a sloped portion of a field.

BACKGROUND ART

Off road work vehicles in the agricultural, mining and construction fields, such as tractors, and the like, have traditionally operated with manual steering. Improvements in control system design and related position sensing technology, such as global positioning systems (GPS), including differential correction systems, as well as real time kinematic (RTK) satellite navigation have led to an increase in the use of automatic guidance control systems for these vehicles. The combination of improved navigation input signals precisely identifying vehicle position and speed with sophisticated on board vehicle electronic control systems allows for automatic guidance systems capable of steering the vehicle with a high degree of accuracy when traversing terrain.

To provide this control, the prior art teaches using satellite positioning information by an onboard vehicle navigation control system to accurately determine and control a vehicle's position while operating in a field. A preplanned route, based on information previously known about the terrain of the field, or a control system generated route may be used. The control methods are well known in the art, and may involve multiple position transmitters or receivers, with various signals used to derive vehicle location, elevation, direction of travel or heading, and speed.

The task of precision guidance of an agricultural vehicle involves not only accurately determining vehicle position in a field, but also defining an efficient array of paths to be followed by the vehicle that will, in conjunction with the swath of an element associated with the vehicle, create an overall swath pattern that efficiently and effectively covers the crop area of a field. The pattern must be located and oriented on the field, and the physical characteristics and limitations of the vehicle and coupled element must be identified and provided to the navigation system. Element or header width, location of the element or header with respect to the vehicle, and limitations on the vehicle and associated element movement, such as minimum turning radius, must also be considered. With this information it is possible to define a series of swath lines for the vehicle to travel in an attempt to cover all cultivatable portions of a field without unnecessary gaps or overlaps.

Calculating the series of paths needed to cover an area without substantial gaps or overlaps is relatively straightforward for straight paths on level terrain; however, not all fields can be covered in this manner. Many fields require the use of paths having a curvature that varies along at least some portion of its length, whether to follow irregularly shaped boundaries, avoid obstacles within the field, follow topographic contours of the ground, implement agronomic farming practices, or contour the ground for irrigation. Such conditions preclude a complete reliance on geometrically predefined paths, such as straight lines or constant radius curves. In addition, many fields include hills or valleys of sufficient slope to create errors in swath pattern calculations based on an assumption of flat terrain. These errors have been seen to cause gaps or overlaps between swaths in some cases.

Previous attempts to correct for errors due to slopes in the terrain use GPS data to determine the slope of the terrain and make swath line corrections as a vehicle traverses the swath. Reference in this regard Keller et al., U.S. Pat. No. 6,463,374 which discloses a method for compensating for a decrease in the effective length of a sprayer rig boom when the sprayer rig is operating on sloped terrain. Based on the disclosure, and particularly FIG. 8A of that patent, it appears that swath path corrections are based on the slope of the terrain at the presently driven swath path. In other words, the system makes corrections to a swath line as it is driven based on the slope of the terrain immediately behind the vehicle (because of computation delays as explained at column 10, lines 22-25). Thus the system is making adjustments to the vehicle course as it traverses the swath and basing those adjustments on the computed slope information associated with the terrain within the same swath.

Practical considerations limit the utility of the system and method of the Keller patent. For example, in an articulated work vehicle, such as a tractor coupled with an element, the articulated portions of the vehicle may not rigidly follow the front portion of the work vehicle creating slippage at the articulated joints of the vehicle and coupled element. This slippage may be due to anticipated conditions, such as turning the work vehicle, or due to unanticipated conditions, such dry or muddy terrain, variations in moisture in hilly terrain, sharpness of the element, tire wear, and other conditions under which the element is not rigidly aligned with the front of the vehicle. This is especially important to note for sloping terrain because of slippage of the element down the slope. The operator may need to manually steer the vehicle to achieve the desired swath line to compensate for slippage. Swath line corrections according to the method of this patent may be ineffective either because they may not be implemented quickly enough to align the articulated portion of the vehicle to the desired swath line, or they will have been overridden by the manual steering of the operator.

Finally, swath lines are typically depicted on a map available to the operator for use during operation. Because the method and system of the referenced patent adjusts and executes the swath path contemporaneously, the swath line is not available to be depicted on a map for the operator. For this reason, the swath line should generally be calculated prior to the time the vehicle engages the swath rather than as the vehicle engages the swath as done in the referenced patent. Thus, what is sought is an apparatus and method to generate swath lines and swath patterns that include swath corrections to compensate for variations in the slope of a field which overcomes at least one of the problems, shortcomings or disadvantages set forth above.

SUMMARY OF THE INVENTION

What is disclosed is an apparatus and method to generate swath lines and swath patterns that include swath corrections to compensate for variations in the slope of a field which overcomes at least one of the problems, shortcomings or disadvantages set forth above. Automatic guidance systems based on Global Positioning Satellite (GPS) information have gained widespread use in work vehicles such as tractors. These systems automatically steer the tractor to follow predetermined swath lines limiting the need for the operator to steer. Thus, operator fatigue may be reduced, and the accuracy of the path of the vehicle may be increased. It is common, however, that the vehicle must be manually turned at the end of the row. Swath lines are typically generated by recording initial position data of the vehicle, defining an initial swath line, and generating additional swath lines for the vehicle. For example, after recording the position of the vehicle, the operator may record two points defining a straight line or more than two points defining a curve as an initial swath line. A swath generating apparatus then automatically generates additional rows or swaths across the field. Typically these swath lines are generated with constant spacing based on the width of the element coupled with the work vehicle. Usually the constant spacing is calculated with respect to a plane tangent to the surface of the earth. When the work vehicle is operating on sloped terrain, however, calculation of swath lines based on the width of the element may lead to overlap of swaths or gaps between swaths that are not reached by the element.

According to an aspect of the present invention, swath lines are generated to compensate for the slope of the field and reduce the gaps between swaths that are not reached by the element coupled to the work machine. The swath lines are generated as the operator traverses the field so the operator may work in the field with less preplanning or preparation. An initial swath line is recorded by the operator along with an initial position of the vehicle. As the vehicle traverses the initial swath line, the spatial position and roll, if available, of the vehicle with respect to the direction of travel is determined. Prior to its initiation, a subsequent swath line is generated as a function of the spatial position and/or roll of the vehicle as it traversed an earlier, or in this case, the initial swath line. In a similar manner further subsequent swath lines are generated based on the spatial position and roll of the vehicle determined as it traversed the earlier swath line. It is preferable for the operator to drive swaths adjacent to or relatively close to previous paths so that the slope information will be more accurate.

According to another aspect of the present invention, swath lines are generated to compensate for the slope of the field and reduce the gaps between swaths that are not reached by the element coupled to the work machine prior to operating in the field based on topographical data that may be obtained from sources such as, but not limited to, topographical maps including elevation, aerial photographs, data obtained from driving the field with a GPS receiver, or a combination of sources. The operator defines an initial swath line and additional swath lines are generated as a function of the topographical data associated with the field. In addition, the field may be divided into patches, each patch having a defined initial swath line and additional swath lines generated as a function of the topographical data associated with that patch. Because the swath lines and swath pattern is preplanned for the entire field, the operator is free to work the field driving swaths in any particular order.

According to yet another aspect of the invention, the swath pattern is predetermined prior to operating in the field based on topographical information as described hereinabove. As the operator works the field, subsequent swath lines are generated for each swath line as driven. If the predetermined swath line and the swath line generated on the field differ by some threshold, the swath line generated on the field is used, and subsequent swath lines are generated for the remainder of the patch of the field.

DETAILED DESCRIPTION OF THE INVENTION

The swath generation apparatus and methods described herein may find application in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. Although the various methods will be described with particular reference to GPS based systems, it should be appreciated that the teachings are equally applicable to control systems using other methods to determine vehicle position.

Figure 1:
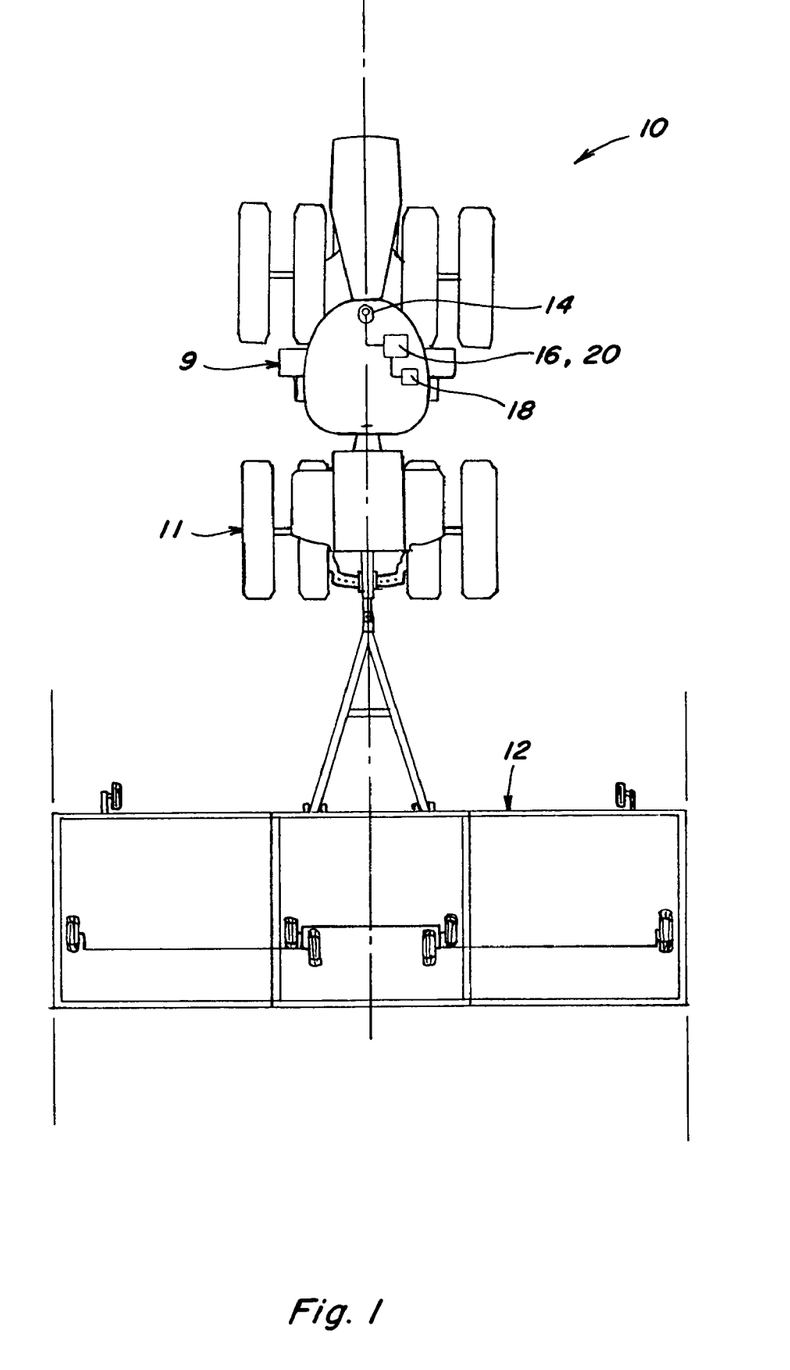
FIG. 1 is a top view of a representative work machine having a coupled element associated therewith.
Figure 2:
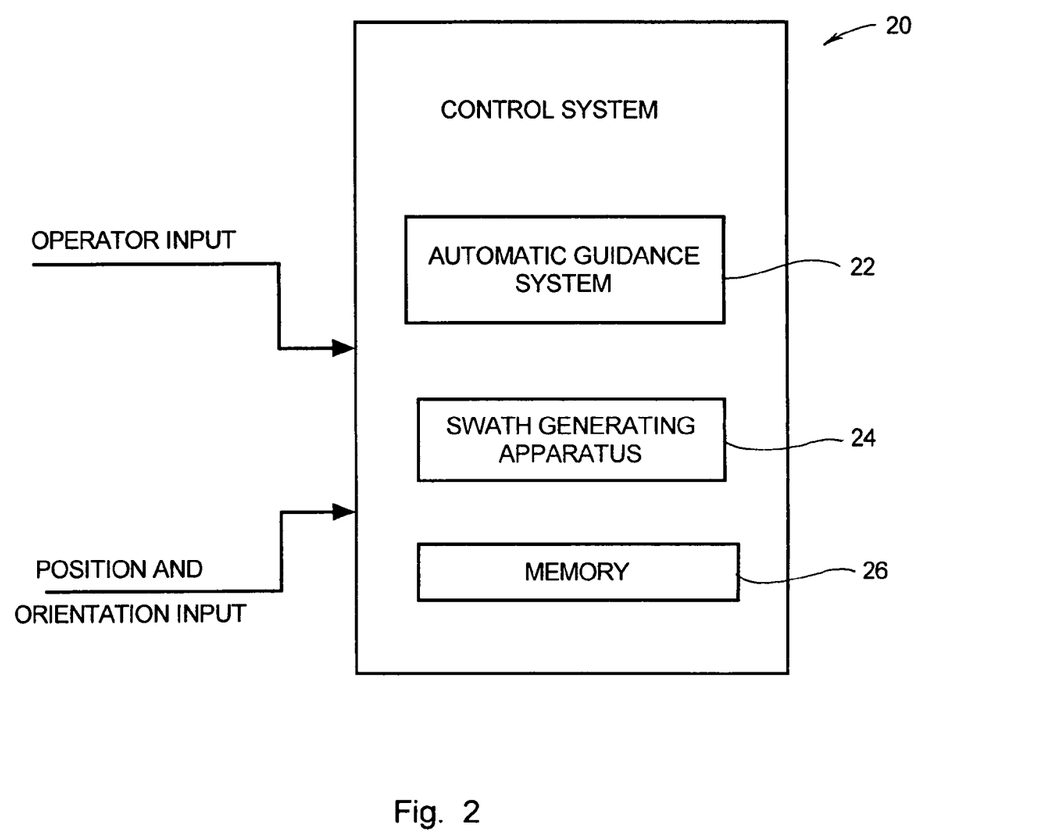
FIG. 2 is a top level representation of an automatic guidance system including a swath generating apparatus according to the present invention.

An articulated work vehicle, represented in FIG. 1 by a tractor 10, and an associated element 12 coupled thereto is of the type commonly used in agricultural and construction operations. Work vehicles are commonly equipped with a global positioning system (GPS), represented by receiver 14, that determines position information used by a control system 20 of an onboard computer 16 to simplify the task of driving tractor 10. Control system 20 associated with tractor 10 includes an automatic guidance system 22, a swath generating apparatus 24, and a memory 26 as shown in FIG. 2. Typically swath generating apparatus 24 generates generally parallel swath lines that, in the aggregate, define a swath pattern that covers the crop growing area of the field. Swath lines are generated based on an initial or baseline swath line often provided or modified by the operator through an operator interface 18 on tractor 10. Automatic guidance system 22 continually calculates a vehicle steering heading by comparing vehicle position and directional heading to a desired swath line provided by swath generating apparatus 24, and sends the vehicle steering heading to a steering unit, which in turn actuates vehicle steering (i.e., steered wheels), thereby changing the vehicle heading in a well known manner. Tractor 10 may further include other sensors, such as vehicle yaw and roll, element hitch angle, and the like, which would also be communicatively coupled to control system 20. Though shown as discreet devices within control system 20, the functions of automatic guidance control system 22, swath generating apparatus 24, memory 26, and other portions of control system 20 can easily be integrated into a single apparatus within the intent of this invention.

Figure 1A:
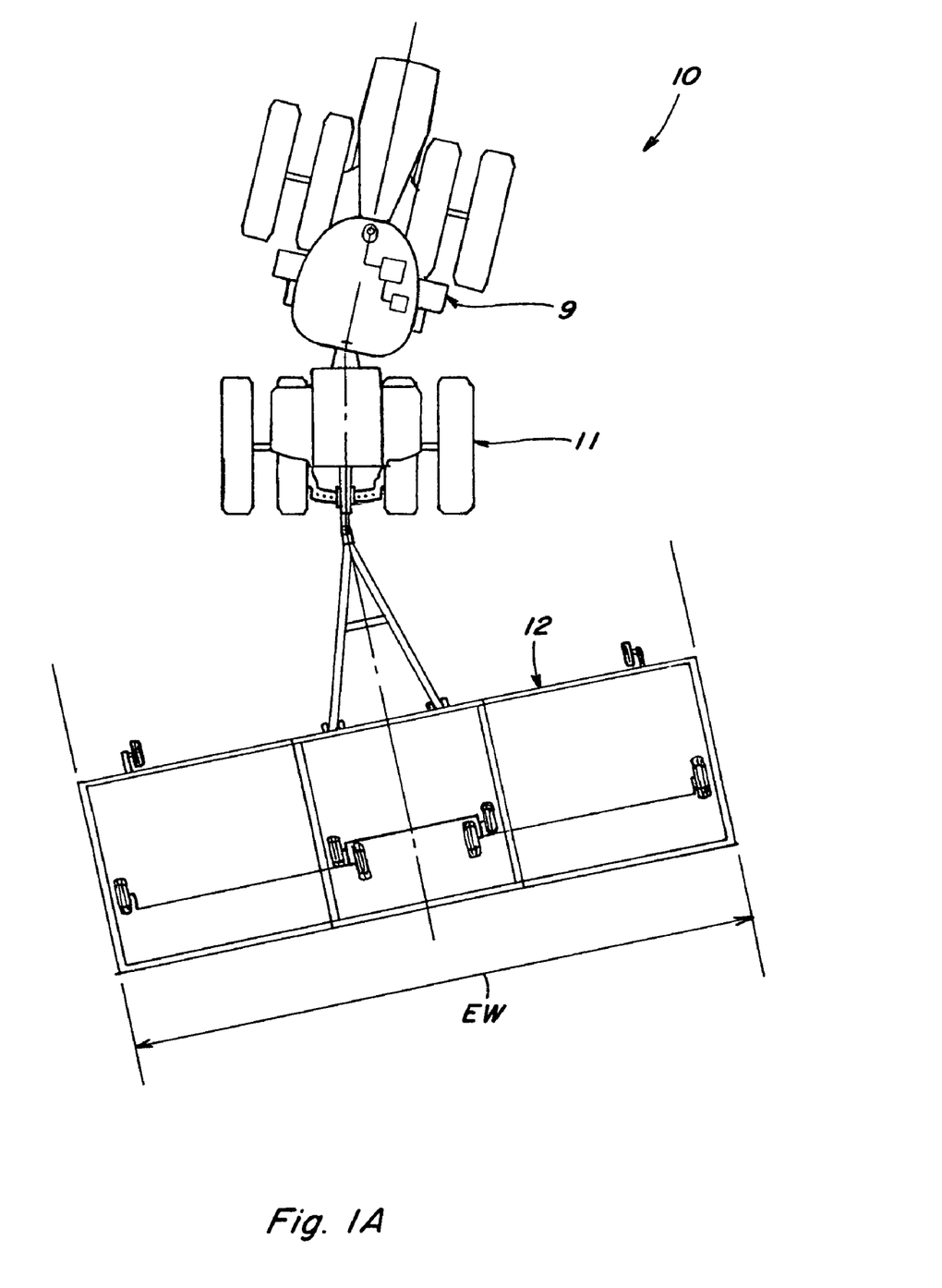
FIG. 1A is a top view of the representative work machine of FIG. 1 having a front portion and a rear portion out of rigid alignment.
Figure 1B:
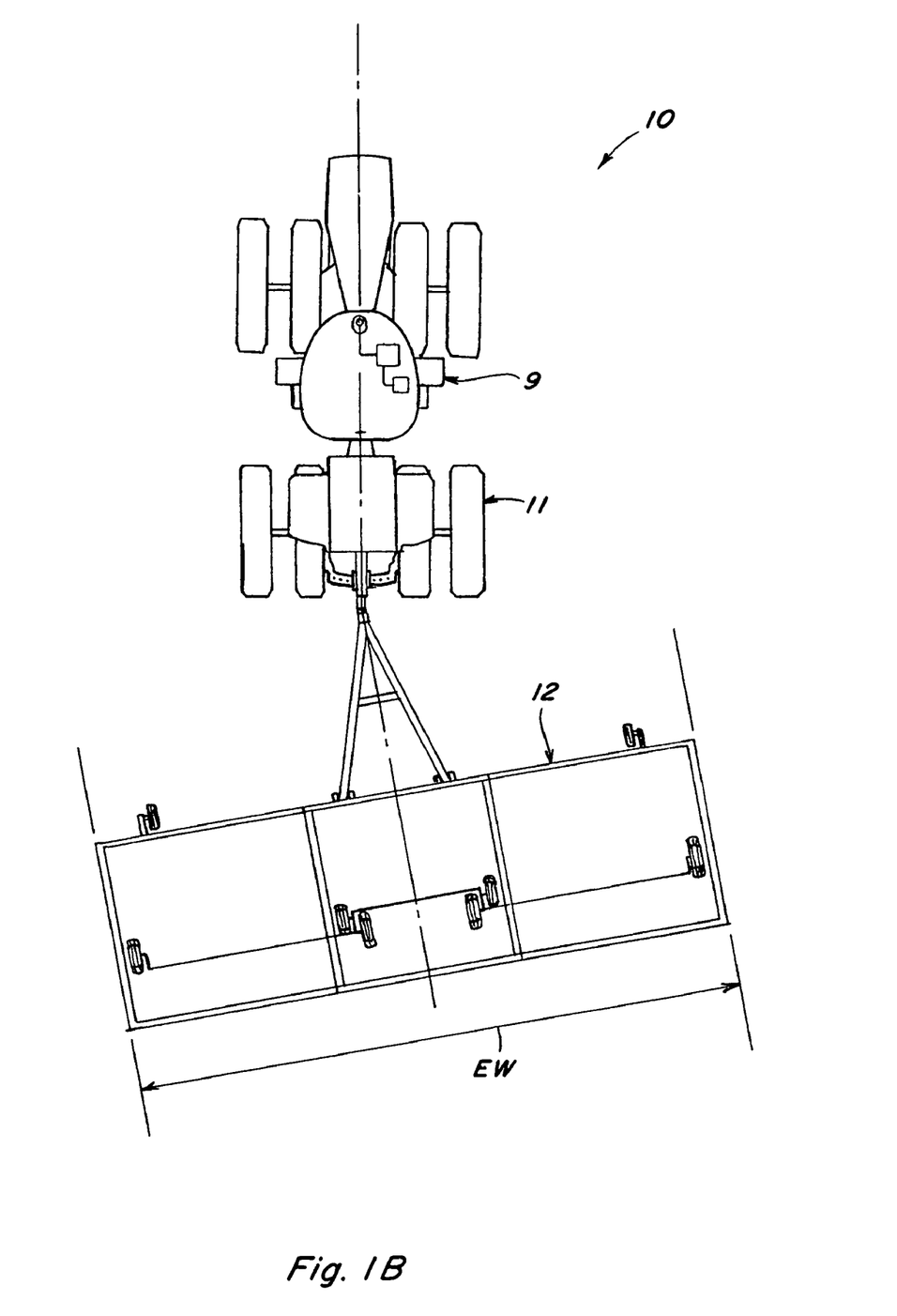
FIG. 1B is a top view of the representative work machine of FIG. 1 having the coupled element out of rigid alignment therewith.
Figure 1C:
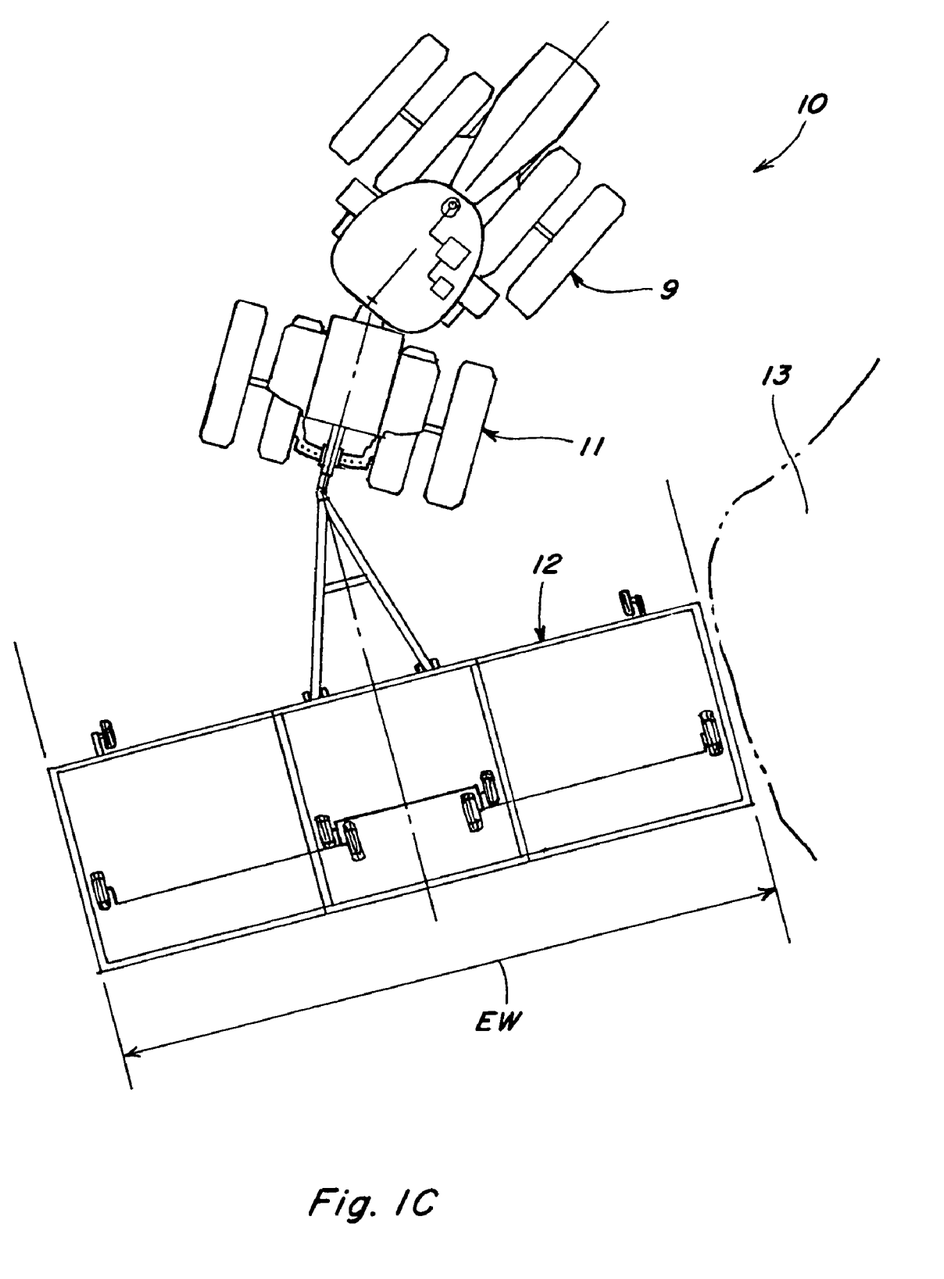
FIG. 1C is a top view of the representative work machine of FIG. 1 having the front portion, the rear portion and the element out of rigid alignment.
Figure 1D:
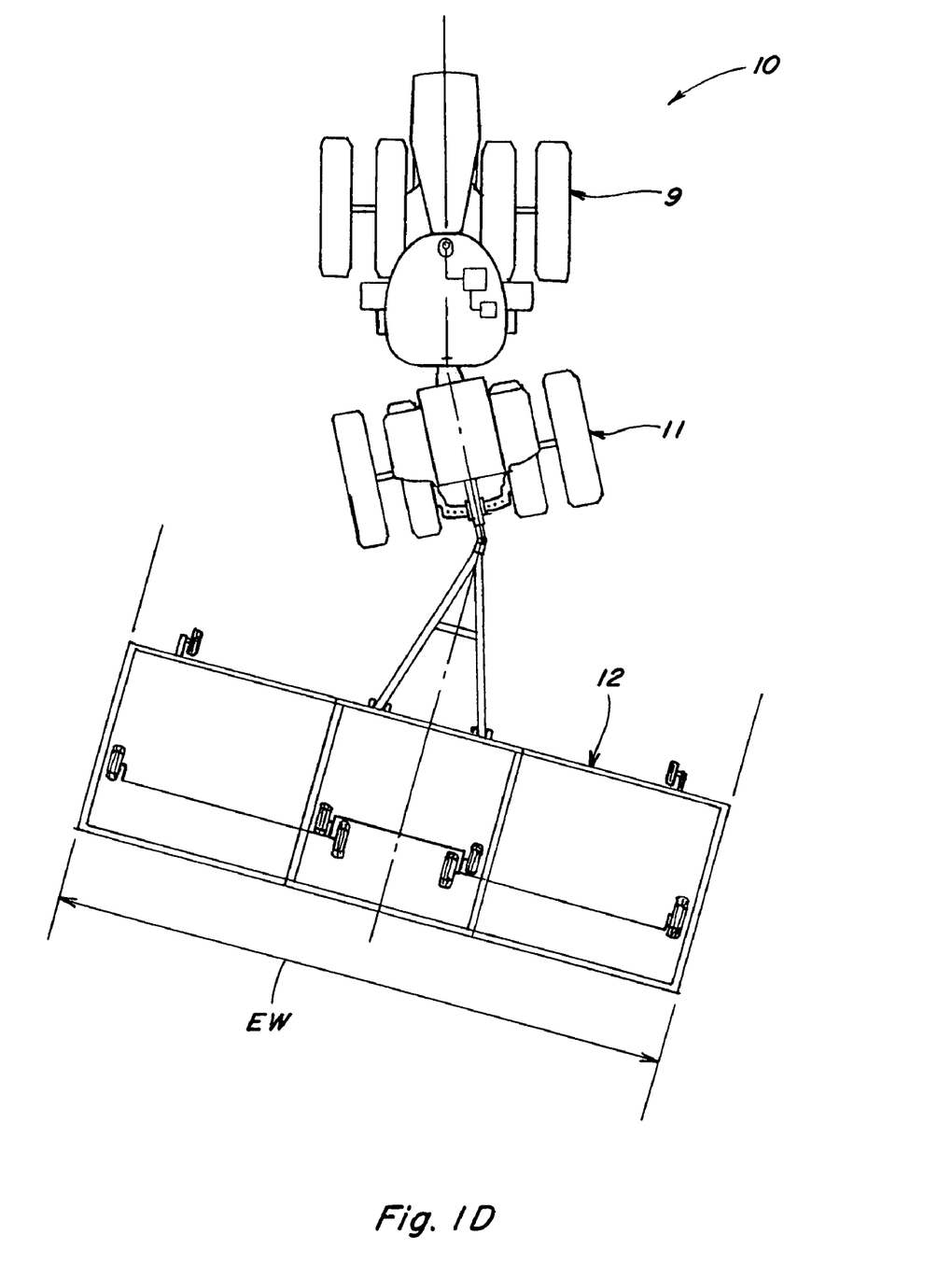
FIG. 1D is a top view of the representative work machine of FIG. 1 having the front portion, the rear portion and the element out of rigid alignment.

Because tractor 10 is articulated, front 9 and rear 11 portions of tractor 10 and element 12 may not maintain rigid alignment when traversing a field as shown in FIGS. 1A-1D. FIG. 1A shows front 9 and rear 11 portions out of rigid alignment, perhaps at the beginning of a turn. FIG. 1B shows front 9 and rear 11 portions in alignment and element 12 out of rigid alignment perhaps slipping down sloped terrain. FIG. 1C shows front 9 and rear 11 portions and element 12 out of rigid alignment perhaps operating along a sharp curve. FIG. 1D shows front 9 and rear 11 portions and element 12 out of rigid alignment perhaps due to element 12 slipping during a right turn moving up sloping terrain. FIGS. 1A-1D are examples of situations in which tractor 10 may deviate from the desired swath line. In such situations, for example, the operator may need use the automatic guidance trim function, or even manually steer tractor 10 for a short distance, to recapture the desired swath line to compensate for slippage of element 12 as shown in FIGS. 1B and 1D, especially when operating on sloping terrain.

Control system 20 of the present invention uses spatial position and orientation (if available) information not only to accurately steer tractor 10 as it traverses a field, but also as an information source to generate swath lines including compensation for a slope of the field. This information may be obtained from one or more generally available sources. For example a corrected Real Time Kinematic (RTK) global positioning system (GPS) that includes a local portable base station can locate tractor 10 to within less than an inch of a desired path. With this capability the present location of tractor 10, as well as previous locations of tractor 10, can be determined and stored in memory 26. Additionally previously generated swath patterns for use by automatic guidance system 22 may be stored in memory 26. Information derived from sensors may also be stored in memory 26 for use by control system 20, such as information indicating orientation of tractor 10 as it traverses the field. Further, topographical information associated with the field based on topographical maps, aerial photographs, previously recorded GPS data, and the like may be stored in memory 26 or at a remote location.

Figure 3:
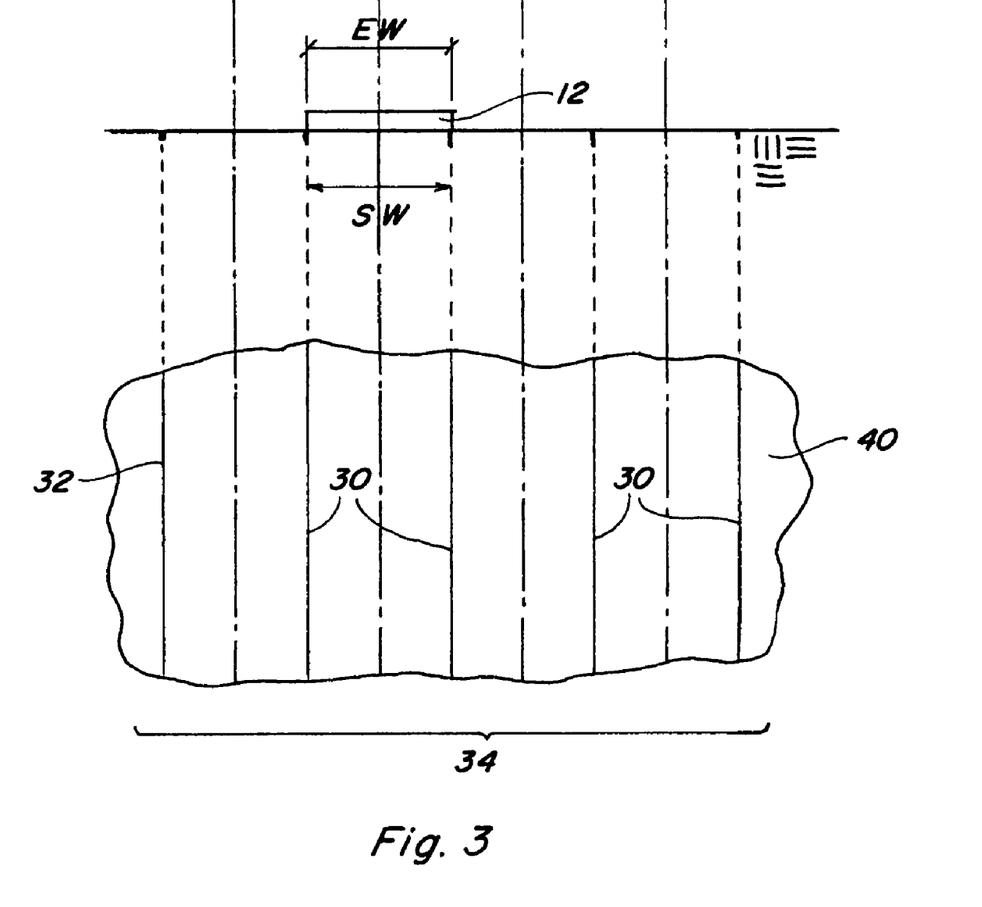
FIG. 3 is a top view of swath lines in a representative swath pattern for a field.

FIG. 3 depicts a set of representative swath lines 30 creating a swath pattern 34 for a portion of a level field 40. Swath lines 30 are based on an initial swath line 32 and a swath width, denoted SW, defined based on the width of element 12, denoted EW. Since field 40 is shown generally level, swath lines 30 are generally parallel and swath width SW is generally the same as element width EW.

Figure 4:
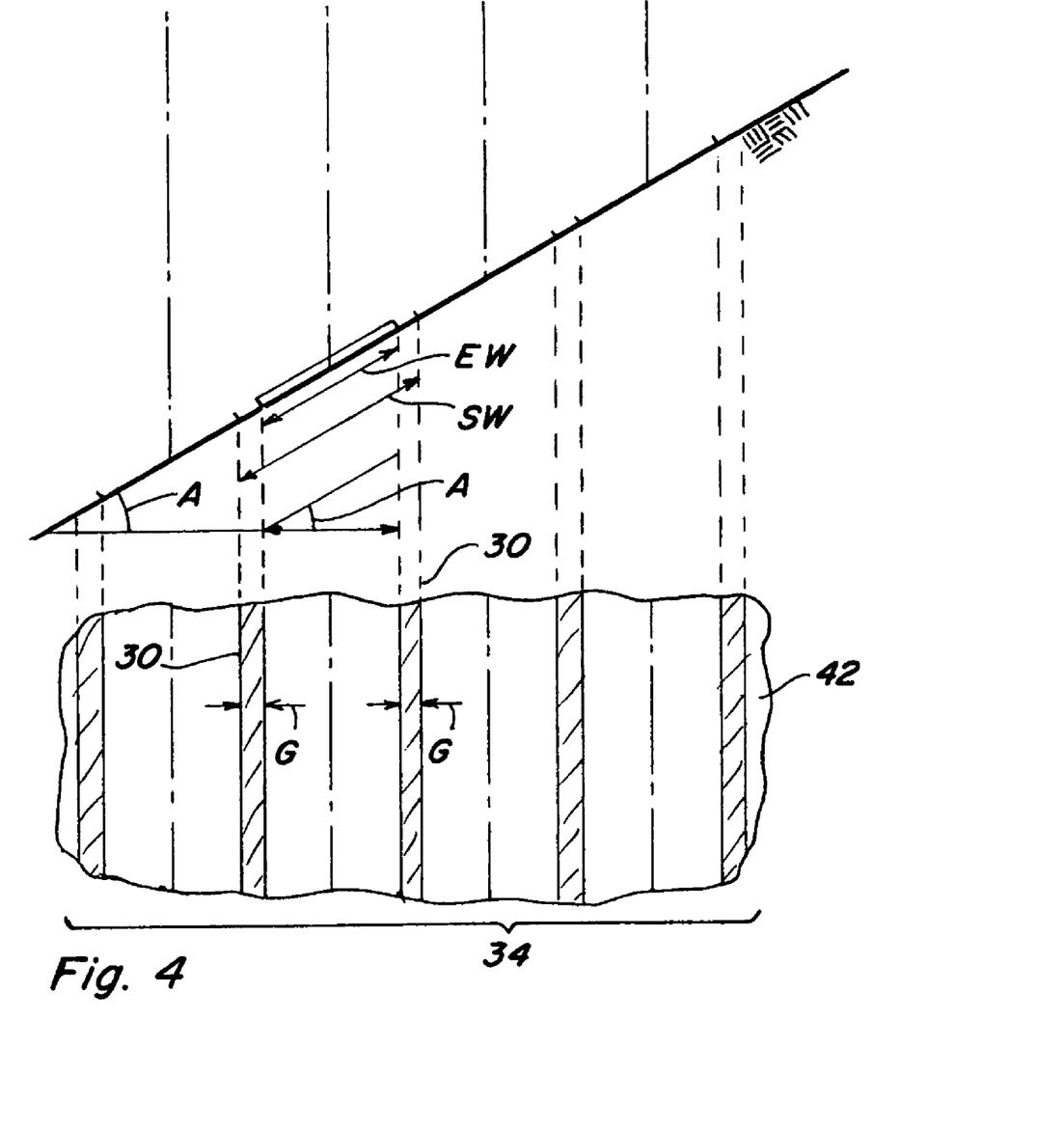
FIG. 4 is a top view of the swath lines of the representative swath pattern of FIG. 3 including a slope of the field.

If swath pattern 34, generated for use with element 12 on level field 40, was used with element 12 on a similar, but sloped, field 42, gaps G would occur between swaths as illustrated in FIG. 4. As can be seen in FIGS. 3 and 4, element width EW is generally a useful approximation to swath width SW on level terrain, but on sloped terrain, a slope angle A must be considered to determine swath width SW. With reference to FIG. 4, the horizontal projection of element width EW provides an approximation to actual swath width ASW is defined as follows:

$$ASW = EW * \cos A$$

For level terrain slope angle A is zero and ASW=EW.

As the slope of the terrain increases, the horizontal projection of the element width EW becomes smaller, and gaps G due to the slope of the terrain become larger. Often the slope of the terrain is expressed as a percent slope, denoted PS, and computed as percent rise divided by run. The width of gap G is geometrically defined as follows:

$$Gap = [EW^2 + (PS/100 * EW)^2]^{1/2} - EW$$

The chart below illustrates representative gap G widths resulting when terrain slope is not taken into account in generating swath lines (i.e. SW=EW).

| Percent Slope (%) | Swath Width (ft) | Gap (in) |
| --- | --- | --- |
| 4 | 10 | 0.09 |
| 4 | 30 | 0.28 |
| 4 | 100 | 0.95 |
| 10 | 10 | 0.60 |
| 10 | 30 | 1.80 |
| 10 | 100 | 6.00 |
| 30 | 10 | 5.28 |
| 30 | 30 | 15.85 |
| 30 | 100 | 52.83 |

Figure 5:
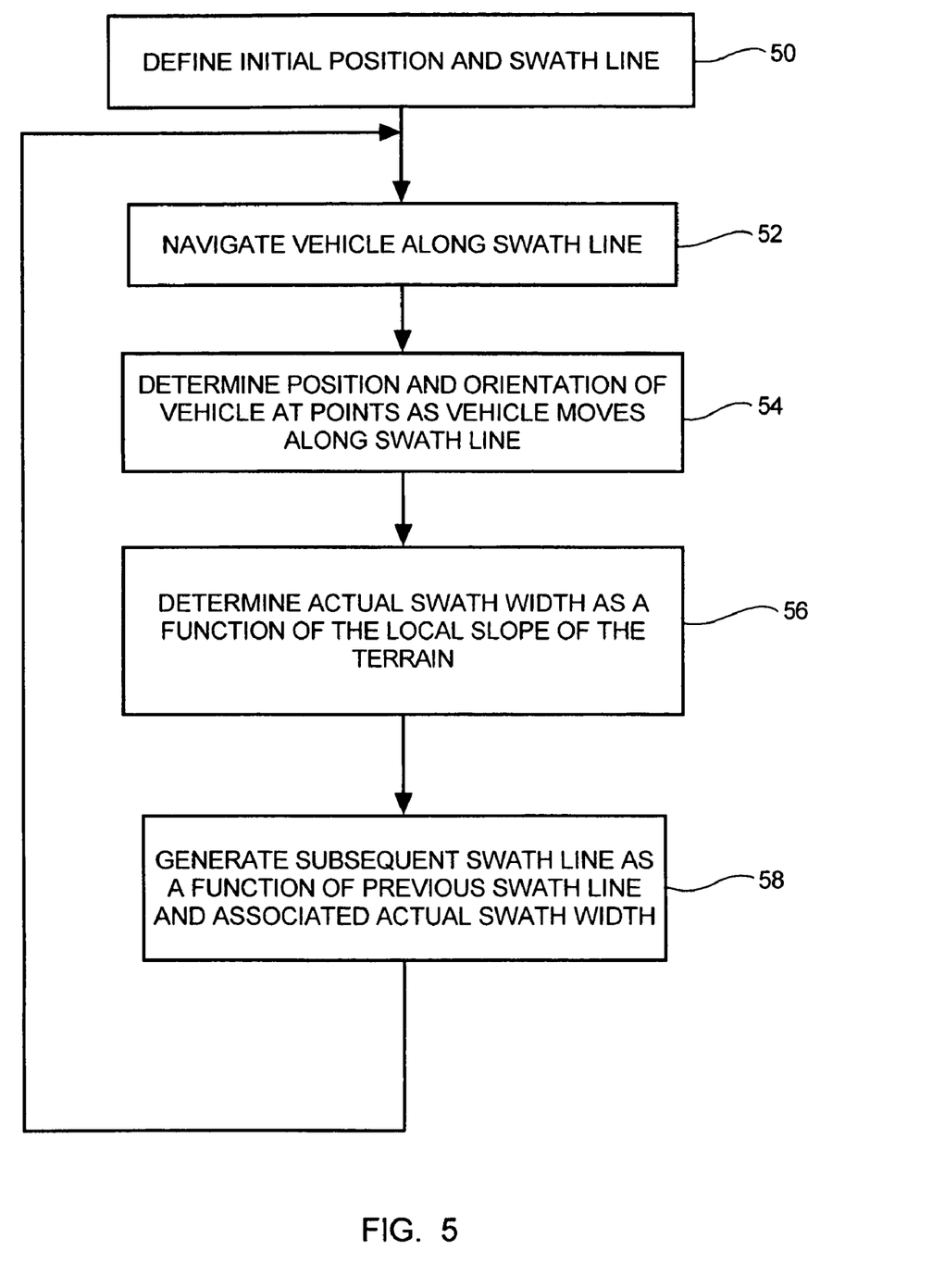
FIG. 5 is a top level flow diagram of a method for generating swath lines in the field according to the present invention.

According to an aspect of the present invention, swath generating apparatus 24 generates swath lines and swath patterns that include swath corrections to compensate for variations in the slope of the field as shown in the top level flow diagram of FIG. 5. The operator records the initial position of tractor 12 along with an initial swath line at operator interface 18 as shown at block 50. As tractor 12 navigates the initial swath line (block 52), spatial position and orientation (if available) of tractor 10 are determined as tractor 10 moves along the swath line (block 54). Swath generating apparatus 24 automatically determines an actual swath width along the swath line as a function of the approximation of the local slope of the terrain (block 56). Local slope may be approximated as a function of the lateral orientation or roll of tractor 10 and/or the vertical position (elevation) of tractor 10 as compared to the vertical position of tractor 10 at the same lateral point on a previous swath. It should be noted that the actual swath width will vary along the swath line with the change in lateral slope therealong. Swath generating apparatus 24 generates a subsequent swath line as a function of the previously traversed swath line and the swath width associated therewith at block 58. Thus the swath pattern is created one swath line at a time, each subsequent swath line generated as a function of position and/or roll orientation of tractor 10 at points along the earlier swath line. If the field is level the subsequent swath lines are generated with constant spacing based on element width EW. When tractor 10 is operating on sloped terrain, however, widths of subsequent swaths will vary to compensate for the slope.

Figure 6:
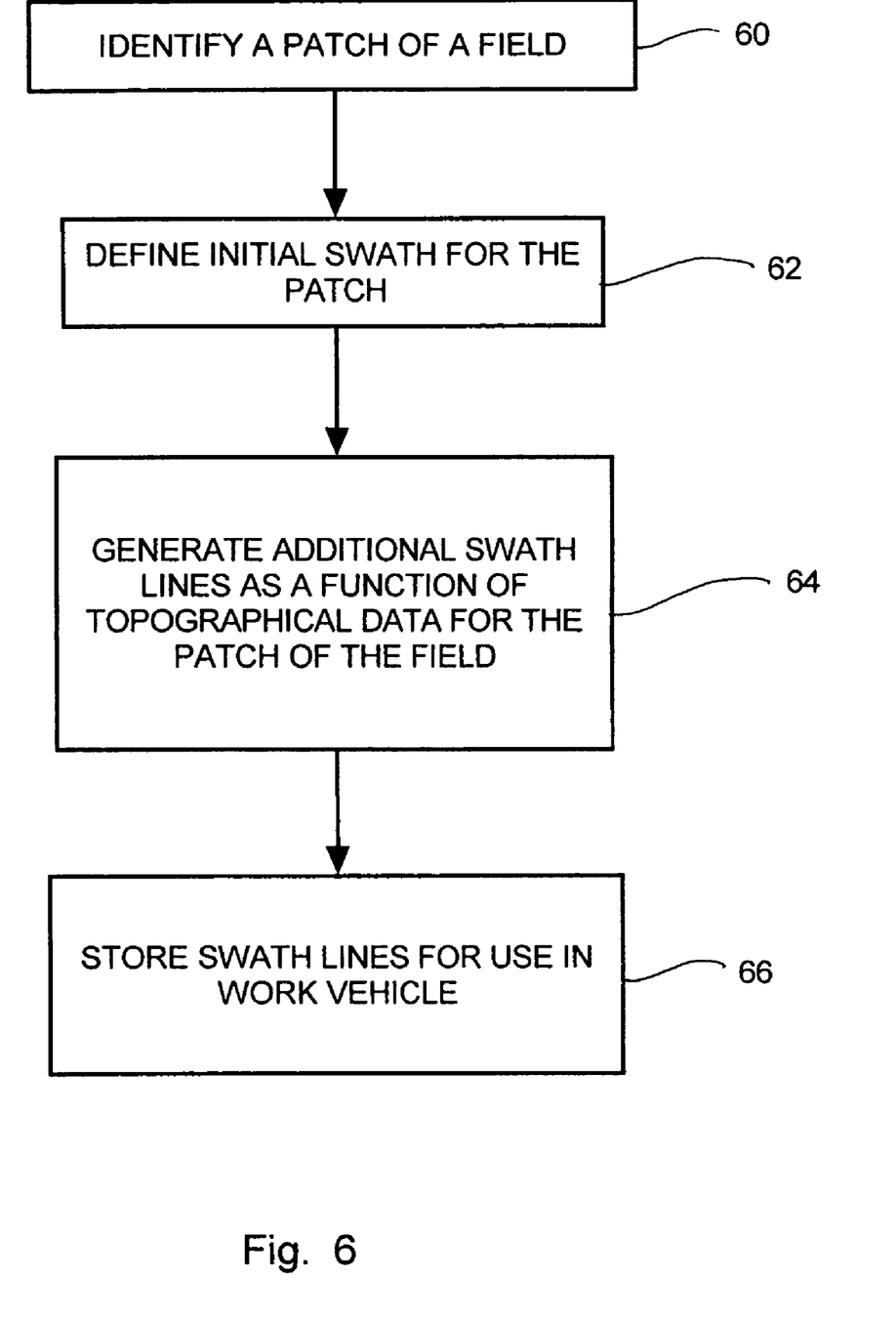
FIG. 6 is a top level flow diagram of a method for predetermining swath lines for the field according to the present invention.

According to another aspect of the present invention, swath generating apparatus 24 generates swath lines and swath patterns that include swath corrections to compensate for variations in the slope of the field prior to operating in the field as shown in the top level flow diagram of FIG. 6. The swath lines are generated as a function of topographical information associated with the field. This information may be obtained from sources such as, but not limited to, topographical maps including elevation, aerial photographs, data obtained from previously driving the field with a GPS receiver, or a combination of sources. As an additional feature the operator has the option to generate a swath pattern for the entire field or divide the field into patches and generate a swath pattern for each patch. The operator defines a patch of a field (block 60) and an initial swath line for the patch (block 62). Swath generating apparatus 24 generates additional swath lines as a function of the topographical data associated with that patch of the field as shown at block 64. The operator then stores the swath lines for the patch for use in tractor 12. As an advantage of this aspect of the invention the operator is free to work the field driving swaths in no particular order because the swath lines and swath pattern is preplanned for the entire field.

According to yet another aspect of the invention, the swath lines may be predetermined prior to operating in the field and used. Swath generating apparatus 24 would still generate subsequent swath lines as a function of information from an earlier swath line. Control system 20 compares the two swath lines and alerts the operator if the lines vary by some predetermined amount. The previously generated swath lines may be replaced by those generated in the field for a particular patch if necessary. The preplanned swath lines can be used again once the operator moves to the next patch.

As an advantage of this invention, the operator may work in the field with or without preplanning the entire swath pattern. If the operator decides to manually override or in some manner a swath line is varied, swath generating apparatus 24 adapts by automatically determining the actual swath width and generating the next swath line based on the swath as driven by the vehicle. As a further advantage, each subsequent swath line is fully generated prior to its execution and available for display, rather than generating each swath line as the vehicle traverses the line.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for generating swath lines for sloping terrain for use in a work vehicle comprising the steps of:
    providing a work vehicle with an associated swath producing element having a lateral extent;
    providing a control system operable to guide the vehicle along an elongate swath line in a pattern of generally parallel elongate swath lines;
    determining position of the vehicle as the vehicle moves along the swath line;
    determining an actual swath width associated with a current swath line as a function of the lateral extent of the swath producing element, the position of the vehicle and a local slope of the terrain along the immediately preceding swath line; and
    generating a subsequent swath line next to the current swath line as a function of the determined actual swath width of the current swath line before commencing the subsequent swath line, wherein each current swath line is next to an immediately preceding swath line with no substantial gaps between swath lines due to terrain which is sloped, data input from the current swath line generating each next subsequent swath line as a function of a determined local slope of terrain traversed during the current swath line by the swath producing element such that gaps between the current swath line and the subsequent swath line are substantially eliminated.

2. A method as set forth in claim 1, wherein the step of determining an actual swath width associated with the swath line as a function of the lateral extent of the swath producing element and the position and slope of the vehicle, includes the steps of:
    calculating a predicted swath line according to the expression:

$$ASW = EW * \cos A$$

wherein:
        EW is the width of the lateral extent of the swath producing element, A is the angle of the terrain, and ASW is the actual swath width, and
    calculating a gap width between swath lines due to slope of the terrain according to the expression:

$$Gap = [EW^2 + (PS/100 * EW)^2]^{1/2} - EW$$

wherein:
        EW is the width of the lateral extent of the swath producing element, and PS is the percent of slope, and
    eliminating gaps between the current swath line and the subsequent swath line.

3. A method as set forth in claim 2, wherein the step of generating a subsequent swath line next to a current swath line as a function of the determined actual swath width of the current swath line before commencing the new subsequent swath line, includes the step of identifying one or more substantial gaps between the current swath line and the subsequent swath line due to terrain which is sloped by 30 percent or more and eliminating the one of more substantial gaps.

4. A method as set forth in claim 1, wherein the actual swath width is determined at more than one position along the swath line, and the actual swath width between the more than one position along the swath line is determined by interpolation therebetween.

5. A method as set forth in claim 2, wherein slope of the terrain for the subsequent swath line is determined at least partially by lateral orientation and vertical orientation of the tractor with regard to slope of the terrain in the current swath line.

6. A method as set forth in claim 1, wherein the control system is further operable to respond to an operator input and guide the vehicle along a modified swath line, and the generated subsequent swath line is a function of the modified swath line and the actual swath width along the modified swath line.

7. A method for generating a pattern of swath lines for sloping terrain for use in a work vehicle having a control system, the work vehicle having an associated swath producing element having a lateral extent, the method comprising the steps of:
    obtaining topographical data including elevation data of a field;
    determining position of the vehicle as the vehicle moves along a current swath line;
    determining an actual swath width associated with the current swath line as a function of the lateral extent of the swath producing element, the position of the vehicle, and a local slope of the terrain along the immediately preceding swath line;
    generating a pattern of generally parallel elongate side-by-side swath lines, each swath line having a lateral extent which varies with changes in lateral slope of the field, such that there are no substantial gaps between the side-by-side swath lines, wherein each swath line generated will have a predicted lateral extent which is a function of an immediately adjacent swath line by calculating a predicted swath line according to the expression:

$$ASW = EW^* \cos A$$

wherein:
EW is the width of the lateral extent of the swath producing element, A is the angle of the terrain, and ASW is the actual swath width, and calculating a gap width between swath lines due to slope of the terrain according to the expression:

$$Gap = [EW^2 + (PS/100^*EW)^2]^{1/2} - EW$$

wherein:
EW is the width of the lateral extent of the swath producing element, and PS is the percent of slope, and generating a subsequent swath line while traveling in the current swath line as a function of the determined actual swath width of the current swath line before commencing the subsequent swath line, wherein each current swath line is next to an immediately preceding swath line with no substantial gaps between swath lines due to terrain which is sloped, data input from the current swath line generating each subsequent swath line as a function of the determined local slope of terrain traversed during the current swath line by the swath producing element such that any gaps between the current swath line and the subsequent swath line are substantially eliminated; and comparing the subsequent swath line with a corresponding swath line from the pattern of swath lines generated from the topographical data, and replacing the previously generated swath line from the pattern with the subsequent swath line generated while traversing the current swath line.

8. A method as set forth in claim 7, wherein the topographical data is based on a topographical map.

9. A method as set forth in claim 7, wherein the topographical data is based on pre-existing spatial position data of the vehicle as the vehicle is driven along the swath of the field.

10. A method as set forth in claim 7, wherein the step of generating a pattern of generally parallel elongate side-by-side swath lines includes the step of identifying one or more substantial gaps between the current swath line and the new subsequent swath line due to terrain which is sloped by 30 percent or more and eliminating the one of more substantial gaps.

11. A method as set forth in claim 7, wherein the pattern of swath lines is generated remotely and communicated to the control system of the work vehicle.

12. An apparatus for generating swath lines for sloping terrain in a field for use in a work vehicle comprising:

a work vehicle with an associated swath producing element having a lateral extent;

a positioning system associated with the work vehicle operable to determine spatial position of the vehicle and communicate information representative of the spatial position of the vehicle;

a control system operable to receive information representative of the spatial position, and further operable to guide the vehicle along a swath line; and a swath generation apparatus having a processing capability and a memory, the swath generating apparatus, in communication with the control system and in cooperation with the positioning system, the swath generating apparatus configured to determine an effective swath width along the swath line as a function of the lateral extent of the swath producing element and a lateral slope of the terrain along the swath line, and further operable to generate at least one subsequent swath line next to a current swath line as a function of a determined local slope of terrain traversed during the current swath line by the swath producing element and the effective swath width therealong, such that gaps between the current swath line and the subsequent swath line are substantially eliminated.

13. The apparatus of claim 12, wherein the swath generation apparatus calculates a predicted swath line according to the expression:

$$ASW = EW^* \cos A$$

wherein:
EW is the width of the lateral extent of the swath producing element, A is the angle of the terrain, and ASW is the actual swath width, and wherein the swath generation apparatus calculates a qap width between swath lines due to slope of the terrain according to the expression:

$$Gap = [EW^2 + (PS/100^*EW)^2]^{1/2} - EW$$

wherein:
EW is the width of the lateral extend of the swath producing element, and PS is the percent of slope, such that the swath generation apparatus adjusts a width of the subsequent swath line to substantially remove gaps from between the current swath line and the subsequent swath line.

14. The apparatus of claim 12, wherein the control system guides the work vehicle along previously generated swath lines forming a pattern of generally parallel elongate swath lines defining swaths having lateral extents which vary with changes in lateral slope of the field, and the swath generation apparatus generates the subsequent swath line; the control system further being automatically operable to compare the subsequent swath line to a corresponding swath line in the pattern and guide the work vehicle along the generated subsequent swath line under predetermined comparison conditions.

15. The apparatus of claim 14, wherein the previously generated pattern of swath lines includes more than one pattern of swath lines associated with more than one swath of the field, and upon engaging each swath, the control system resumes guiding the work machine along previously generated swath lines.

16. The apparatus of claim 13, wherein the swath generation apparatus identifies one or more substantial gaps between the current swath line and the new subsequent swath line due to terrain which is sloped by 30 percent or more and eliminates the one of more substantial gaps.

\* \* \* \* \*